United States Patent [19]

Warner

[11] 4,103,767

[45] Aug. 1, 1978

[54] ELEVATING APPARATUS

[75] Inventor: Kent F. Warner, White Plains, N.Y.

[73] Assignee: W & H Conveyor Systems, Inc., Carlstadt, N.J.

[21] Appl. No.: 762,366

[22] Filed: Jan. 25, 1977

[51] Int. Cl.² ............................................. B65G 37/00
[52] U.S. Cl. .................................. 198/366; 198/607; 198/725
[58] Field of Search ............... 198/698, 699, 688, 734, 198/725, 846, 607, 601, 370, 721, 366; 193/20

[56] References Cited

U.S. PATENT DOCUMENTS

| 751,170 | 2/1904 | Hopkins et al. | 198/725 |
| 1,084,162 | 1/1914 | Moser | 193/20 |
| 1,879,944 | 9/1932 | Muth | 198/607 X |
| 2,803,463 | 8/1957 | Congelli | 198/725 X |
| 3,339,710 | 9/1917 | Milgielese et al. | 198/688 |
| 3,819,030 | 6/1974 | Warner | 198/688 X |

Primary Examiner—Evon C. Blunk
Assistant Examiner—Douglas D. Watts
Attorney, Agent, or Firm—Seidel, Gonda & Goldhammer

[57] ABSTRACT

Packages, containers and the like are moved from one elevation to another by means of an endless conveyor having generally vertical runs and a generally vertical, slippery reaction surface along said vertical run. The endless conveyor has elastic cords or the like for embracing the package, container or the like and pushing it along said surfaces between an input conveyor and a discharge conveyor.

7 Claims, 2 Drawing Figures

ELEVATING APPARATUS

BACKGROUND

The general subject matter of this invention is an elevating apparatus of the conveyor type believed to be classified in Class 198. This invention is an improvement over the apparatus disclosed in U.S. Pat. No. 3,819,030. While the apparatus disclosed in said patent performs satisfactorily, it is limited as pertains to the elevation of the input and discharge conveyors which are at fixed, predetermined locations. The elevating apparatus of the present invention has a number of advantages as compared with the apparatus disclosed in said patent.

SUMMARY OF THE INVENTION

This invention is directed to an elevating apparatus wherein an endless conveyor having generally vertical runs is provided with a plurality of flexible cords for contacting and pushing a package or container along one of said vertical runs. An input conveyor means and a discharge conveyor means are provided at different elevations adjacent said one vertical run. A generally vertical, slippery reaction surface is provided along said vertical run and is stationary with respect to said endless conveyor during movement of the same. Thus, packages or containers are moved from the input conveyor means to the discharge conveyor means by said cords cooperating with said slippery reaction surface.

In specific embodiment of the apparatus of the present invention, the slippery reaction surface is defined by a plurality of discrete moveable panels at different elevations. A discharge or input conveyor means is provided at the elevation of each panel. By using a stationary slippery reaction surface, there is a significant savings in cost as compared with the conveyor belt disclosed in my above-mentioned patent. Further, there is an operational advantage in this invention which allows the packages or conveyors to be discharged at different elevations by means of structure which is simple, reliable and inexpensive.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown elevating apparatus in accordance with the present invention designated generally as 10.

Figure 1:
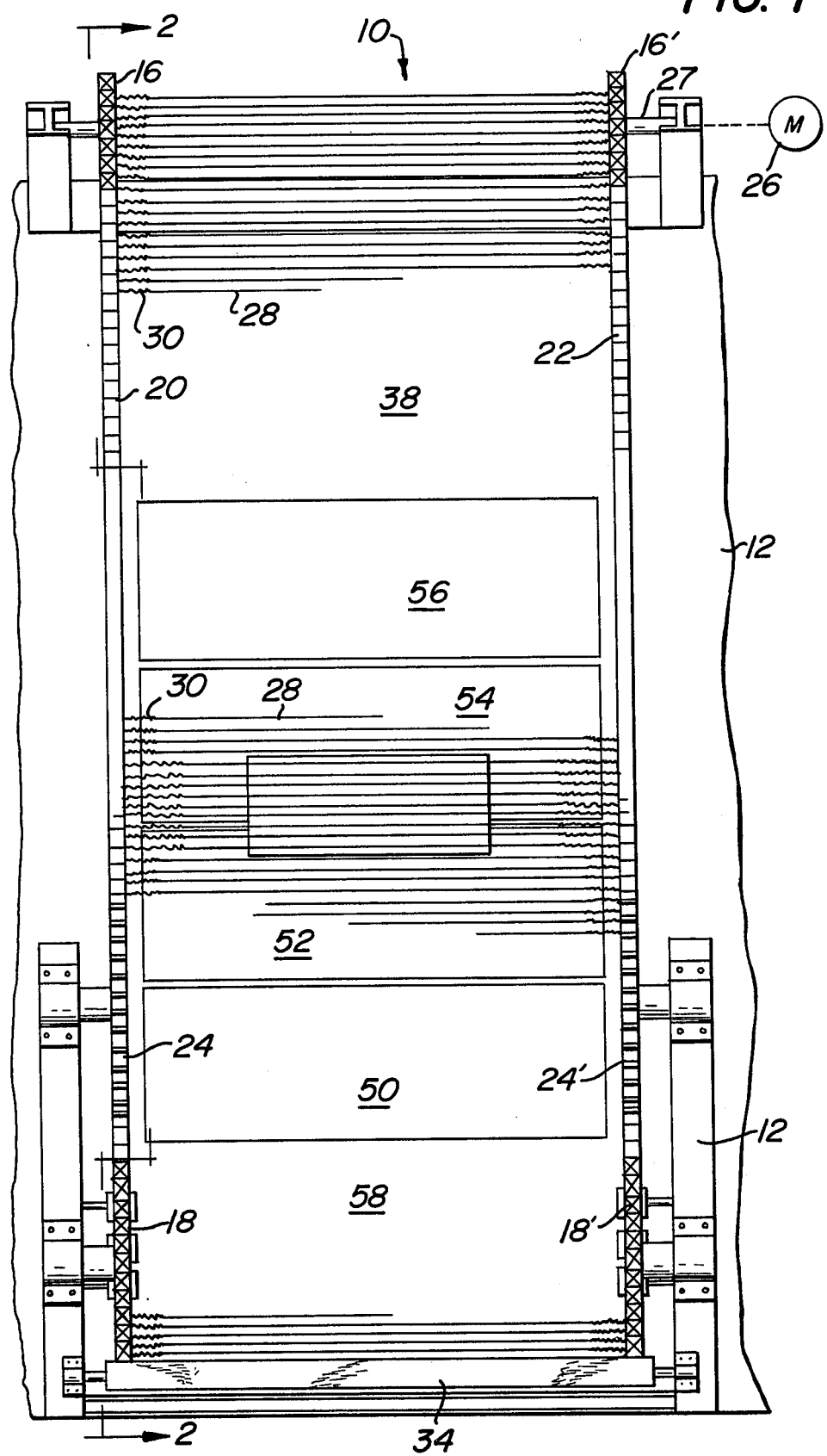
FIG. 1 is a front elevation view of the elevating apparatus of the present invention.

The elevating apparatus 10 includes a frame 12 having an endless conveyor 14. Conveyor 14 is, in all material respects, identical to the conveyor mechanism 8 in my above-mentioned patent except as will be made clear hereinafter.

The frame 12 supports upper sprockets 16 and 16' and lower sprockets 18 and 18' on respective common shafts. Endless chains 20 and 22 extend around the pairs of sprockets 16, 18 and 16', 18' respectively.

It will be noticed that the endless conveyor 14 has generally vertical runs. Idler sprocket 24 is disposed immediately above the sprocket 18 for adjusting the tension of the chain 20. A similar sprocket 24' is provided for the chain 22.

A motor 26 is connected to the shaft 27 on which the sprockets 16, 16' are supported. Hence, sprockets 16, 16' are drive sprockets while sprockets 18, 18' are driven sprockets. If desired, motor 26 could be connected to the shaft on which the sprockets 18, 18' are mounted so as to reverse the identity of the drive and driven sprockets.

A plurality of flexible elastic cords 28 extend across the chains 20, 22 in closed spaced relationship as described in my above-mentioned patent. Each cord 28 is attached to the chains 20, 22 by way of a spring 30 as descibed in my above-mentioned patent. For clarity of illustration, the track and guide rollers associated with the chains 20, 22 as disclosed in my above-mentioned patent are not illustrated in the drawings attached hereto.

Figure 2:
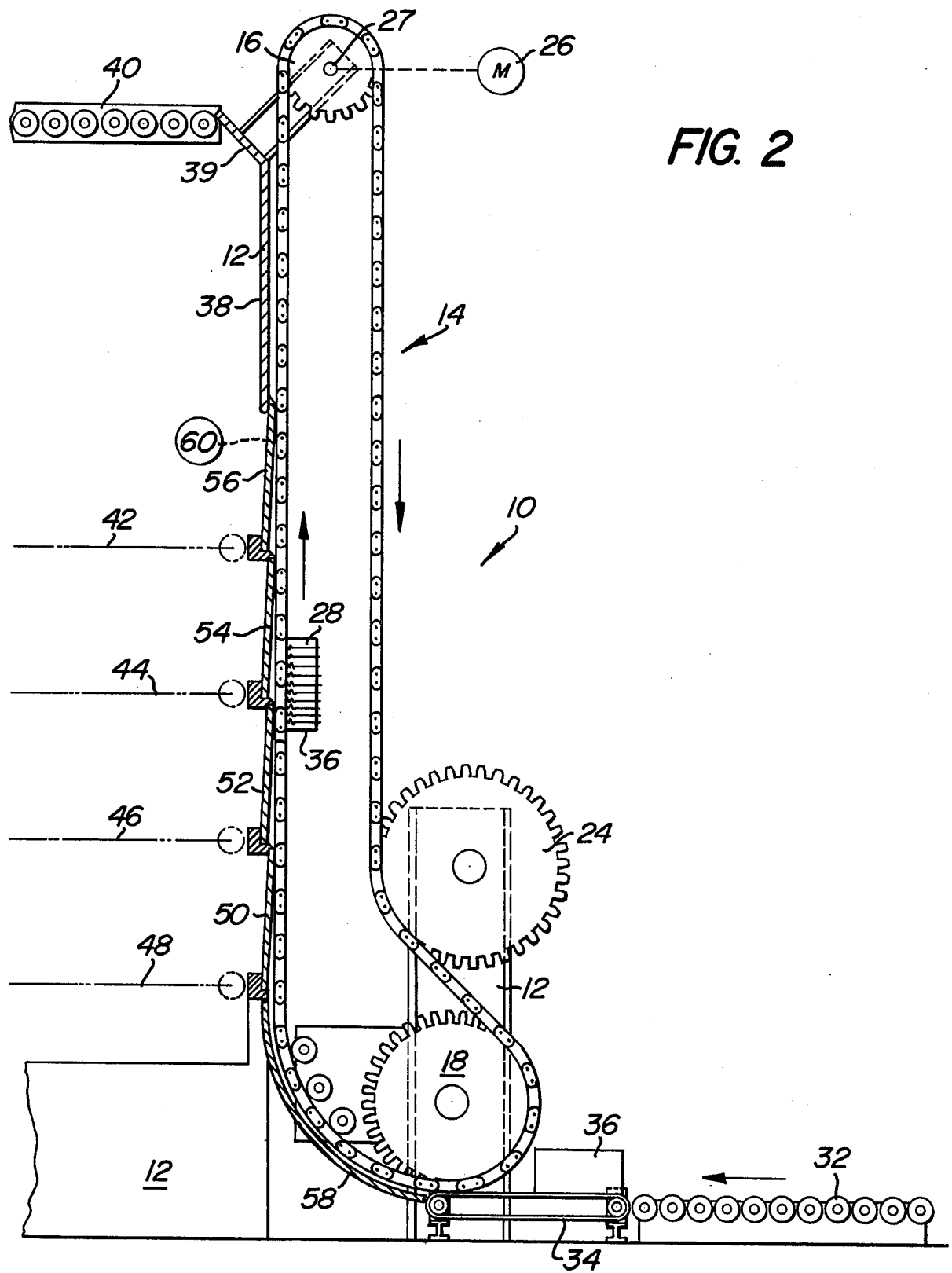
FIG. 2 is a sectional view taken along the line 2—2 in FIG. 1.

The elevating apparatus of the present invention is adapted to move packages or containers from a lower elevation to a higher elevation or vice versa. For purposes of illustration, the input end is at the lower elevation. As shown in FIG. 2, an input conveyor means includes powered or gravity rollers 32 for for delivering a package 36 to a short endless conveyor belt 34. The drive motor for conveyor belt 34 is not shown in the drawings. The endless conveyor 14 will convey the package 36 to the discharge conveyor means 40. Immediately below and adjacent to the elevation of conveyor means 40, the frame 12 includes a panel 38 having an angled portion 39.

The elevating apparatus 10 of the present elevation includes a plurality of discharge conveyor means 40, 42, 44, 46 and 48 at different elevations which may constitute different floors in a building such as a warehouse. A moveable panel 50 is provided adjacent the vertical run of the conveyor 14 at the elevation of discharge conveyor means 48. A similar panel 52 is provided adjacent the elevation of conveyor means 46. A similar panel 54 is provided adjacent the elevation of conveyor means 44. A similar panel 56 is provided adjacent of conveyor means 42. A stationary fixed curved panel 58 extends between the conveyor belt 34 and the panel 50.

The panels 38, 39 and 50-58 are provided with a slippery surface juxtaposed to the cords 28. The slippery surface may be a layer of wax, a layer of polymer plastic material such as Teflon, polyethelene, etc. The panels 50-56 are selectively removeable in any convenient manner such as by being slid in an endwise direction. When the panels 50-56 are in the position as illustrated in FIG. 2, the package 36 will be conveyed from the input conveyor means 32, 34 to the discharge conveyor means 40. By reversing the motor 26, packages may be transmitted from the conveyor 40 to the conveyor means 32, 34.

If one of the panels 50-56 is removed, all packages will immediately discharged at the location thereof onto the adjacent conveyor discharge means. For example, if panel 56 is removed, all packages 36 will be discharged onto the conveyor discharge means 42 from either conveyor means 32, 34 or conveyor means 40 depending on the direction of movement of the conveyor 14.

The cords 28 need not be discrete individual parallel cords but instead may be an elastic net, an elastic fabric, etc. The elastic cords, net or fabric are stretched when embracing a package 36. As soon as the package 36 is opposite an opening for discharge of the package, the elastic force propels the container onto the discharge conveyor means juxtaposed thereto. The panels 50-56 need not be removeable in an endwise direction but instead can be pivotably mounted. The panels may be moved by an actuator 60 such as a cylinder, solenoid, motor or the like capable of being controlled from a remote location. Thus, the operator at the elevation of input conveyor means 32, 34 may select the elevation at which the packages will be discharged.

A typical example of panel 38 and 50–58 would be a sheet of aluminum having a coating of a polymeric plastic material up to about 0.002 to 0.020 inches thick and wherein the polymeric plastic material has a coefficient of friction of about 0.6 or less. Other materials such as wood or polymeric plastics may be utilized as the base substrate for the panels 50–58. In view of the slippery surface on the panels 38 and 50–58, only one endless conveyor is needed to elevate packages or containers.

The present invention may be embodied in other specific forms without departing from the spirit or essential attributes thereof and, accordingly, reference should be made to the appended claims, rather than to the foregoing specification as indicating the scope of the invention.

I claim:
1. Apparatus comprising:
    (a) an endless conveyor having generally vertically runs, said conveyor having stretchable means for contacting and pushing a package along one of said runs,
    (b) an input conveyor means and a discharge conveyor means at different elevations adjacent said one run of said endless conveyor,
    (c) a generally vertical, slippery reaction surface along said one run and stationary with respect to said endless conveyor for cooperation with said stretchable means to confine a container as it is moved generally vertically along said one run, said reaction surface being defined by a plurality of panels at least one of which is movable to a position to provide an opening adjacent one of said conveyor means and through which a container can be moved.

2. Apparatus in accordance with claim 1 wherein said discharge conveyor means includes a plurality of discharge conveyors at different elevations, and said panels including a moveable panel adjacent each discharge conveyor so that packages may be transported from said input conveyor means to a selected one of said discharge conveyors by moving the panel to provide a discharge opening at the selected discharge conveyor.

3. Apparatus in accordance with claim 1 wherein said panels have a coefficient or friction at least as low as 0.6 on the surface thereof juxtaposed to said endless conveyor.

4. Apparatus in accordance with claim 1 wherein said reaction surface includes a curved panel adjacent to and juxtaposed to the lower end of said endless conveyor, said last-mentioned panel having an angle of curvature of approximately 80° to 90°.

5. Elevating apparatus comprising:
    (a) an endless conveyor having generally vertical runs, said conveyor having stretchable means for contacting and pushing a package along one of said runs,
    (b) an input conveyor means and a discharge conveyor means at different elevations adjacent said one run of said endless conveyor,
    (c) a generally vertical, slippery reaction surface along said one run and extending between the conveyor means for cooperation with said stretchable means to confine a container as it is moved generally vertically along said one run between said input conveyor means and discharge conveyor means, said reaction surface being defined by a plurality of panels at least one of which is moveable to a position to provide a discharge opening immediately adjacent said discharge conveyor means, and said reaction surface including a curved stationary panel adjacent to and juxtaposed to the lower end of said endless conveyor.

6. Apparatus in accordance with claim 5 wherein said discharge conveyor means includes a plurality of discharge conveyors at different elevations, and said panels including a moveable panel adjacent each discharge conveyor so that packages may be transported from said input conveyor means to a selected one of said discharge conveyors by moving the panel to provide a discharge opening at the selected discharge conveyor.

7. Apparatus in accordance with claim 6 wherein said panels have a coefficient of friction at least as low as 0.6 on the surface thereof juxtaposed to said endless conveyor.

* * * * *